United States Patent [19]
Harza

[11] Patent Number: 5,022,385
[45] Date of Patent: Jun. 11, 1991

[54] ERGONOMIC ANTI-FATIGUE SEATING DEVICE AND METHOD

[76] Inventor: Richard D. Harza, 655 Sheridan Rd., Winnetka, Ill. 60093

[21] Appl. No.: 430,806

[22] Filed: Nov. 2, 1989

[51] Int. Cl.⁵ ............................................. A61H 1/00
[52] U.S. Cl. .................................. 128/33; 128/24.2; 128/66; 5/455
[58] Field of Search .............. 128/24.2, 24.3, 24.4, 128/25 R, 25 B, 33, 44, 65–67; 297/284, DIG. 3; 5/453, 455, 456

[56] References Cited

U.S. PATENT DOCUMENTS

| | | |
|---|---|---|
| 3,270,440 | 9/1966 | Radosevic, Jr. ......... 297/DIG. 3 X |
| 3,477,071 | 11/1969 | Emerson ................................. 128/33 |
| 3,492,988 | 2/1970 | De Mare ................................. 128/33 |
| 3,613,671 | 10/1971 | Poor et al. ......................... 128/33 X |
| 3,867,732 | 2/1975 | Morrell ........................... 297/284 X |
| 4,796,948 | 1/1989 | Paul et al. ........................... 297/284 |
| 4,840,425 | 6/1989 | Noble ................................. 297/284 |
| 4,915,124 | 4/1990 | Sember, III .............. 297/DIG. 3 X |

*Primary Examiner*—Richard J. Apley
*Assistant Examiner*—Joe H. Cheng
*Attorney, Agent, or Firm*—Willian Brinks Olds Hofer Gilson & Lione

[57] ABSTRACT

A method and apparatus is disclosed for periodically and rhythmically lifting first one hip of a seated person and then the other, thereby simulating the muscle stimulation and relaxation imparted to the person through walking while the person is seated. Inflatable air bags provide lift to the seated person while an electric timer and control valve control the timing and distance of inflation.

58 Claims, 2 Drawing Sheets ized method. More particu- relates to a seating device and method in which rhythmic and periodic motion, similar to that achieved through walking, is translated to the lower midsection of a seated person.

ERGONOMIC ANTI-FATIGUE SEATING DEVICE AND METHOD

FIELD OF THE INVENTION

This invention relates generally to an ergonomic anti-fatigue seating device and method. More particularly, the invention relates to a seating device and method in which rhythmic and periodic motion, similar to that achieved through walking, is translated to the lower midsection of a seated person.

BACKGROUND OF THE INVENTION

Although it is less publicized than other forms of exercise, walking is one of mankind's oldest and most universal methods of muscle relaxation and stimulation. In this age of high-tech exercise equipment and low impact aerobics, many have forgotten the fact that we can achieve beneficial muscle and spinal stimulation from a simple stroll around the block.

An explanation of the dynamics of walking illustrates the various muscle and spinal movements that take place when a person walks. The lower spine rests on the pelvis whereby pelvic movement controls lower spine movement. Consider the three main forces that operate on the pelvis of an upright standing person. The right and left thigh bone each push up on opposite ends of the pelvis, while the centrally located spine pushes down. These three forces balance each other out and the pelvis remains horizontal in the transverse direction. When a person begins to walk, the weight is shifted to one foot, for example the right foot, and the left foot is lifted off the ground. At this instant, the three forces are no longer in balance. The right thigh bone pushes up on the pelvis; the spine pushes down; and the weight of the raised left leg pulls down. The result is that the pelvis tilts down on the left side and the spine tilts out in the direction of the left side. This spine tilt would produce a side to side motion of the spine and upper body when walking. However, this normally does not happen because as soon as the spine starts its leftward tilt, the lower spine spontaneously flexes or curves itself to the right. This effectively cancels the tendency of the upper body to move to the left. A similar but opposite action occurs as a person next steps with the left foot. Thus, a stable upper body position is maintained while walking.

The above-described lateral flexing of the lower spine occurs during each step in the walking process, and has a great effect on the health, blood circulation, and proper functioning of the organs (including digestive) that are located in the lower midsection. Since a normal person may take from 1,000 to 10,000 steps each day, it can be seen that lateral flexing is the dominant type of movement for the lower spine.

It would be beneficial to provide an ergonomic device which could simulate to some extent the walking process while a person is performing another different activity, for example sitting. Ergonomics is generally defined as an applied science concerned with the application of biological and engineering data to problems relating to mankind's interaction with machines. To date, there is no known ergonomic device which is designed to simulate the walking process in a seated person.

Prior seating arrangements have been proposed for providing general movement to the user. Examples of such arrangements include the patents to Noble, U.S. Pat. No. 4,840,425 and Morrell, U.S. Pat. No. 3,867,732.

Noble discloses a seat having inflatable portions or sections 60, 62 and 64, 66 defined within the seat bottom and seat back for inflation/deflation. The Noble patent makes no distinction between left and right sides. It produces undulations in a forward and upward direction as opposed to the right and left motions of walking. Also, Noble provides continuous overall cushioned support over the area of the seat. Morrell discloses a system similar to Noble which provides for automatic cycling. The Morrell patent also makes no distinction between the left and right sides. Morrell provides continuous area wide cushioned support coming from one or the other set of alternating, parallel tubes.

It is accordingly an object of this invention to provide an ergonomic anti-fatigue seating device and method in which motion is translated to the lower midsection of the user which is similar to the motion produced by walking.

It is a feature of the device and method of this invention to provide variable motion to the lower midsection of a user wherein the right and left hips of the user are alternately lifted a predetermined distance in a continuous, periodic and predetermined cycle.

It is a further feature of the device and method of this invention to provide variable motion to the lower midsection of a user wherein the right and left hips of the user are alternately lifted and pushed forward a predetermined distance in a continuous, periodic and predetermined cycle.

Thus, it is an advantage of this invention that a user can achieve some of the benefits normally attainable through walking, while performing other tasks such as driving an automobile or a truck or working in an office or any other activity which involves sitting.

SUMMARY OF THE INVENTION

To achieve the foregoing objects, features and advantages, the ergonomic anti-fatigue seating device of the present invention comprises a pair of inflatable right and left compartments, with the right compartment positioned under the right hip of a seated person and the left compartment positioned under the left hip of the seated person. Inflation means periodically inflates one compartment and then the other, thereby periodically raising one hip and then the other to simulate the motion imparted to the lower midsection of a person when the person is walking.

In an alternative embodiment, an additional pair of inflatable right and left compartments are positioned one behind each hip of a seated person. Inflation means periodically inflates one compartment and then the other, thereby periodically pushing forward first one hip and then the other. Inflation of the right and left back compartments may be coordinated with the inflation sequence of the right and left seat compartments. Thus, the device further simulates the motion imparted to the lower midsection of a person when the person is walking.

BRIEF DESCRIPTION OF THE DRAWINGS

A greater appreciation of the objects, features and advantages may be understood by a detailed description taken in conjunction with the drawings wherein.

DETAILED DESCRIPTION

Figure 1:
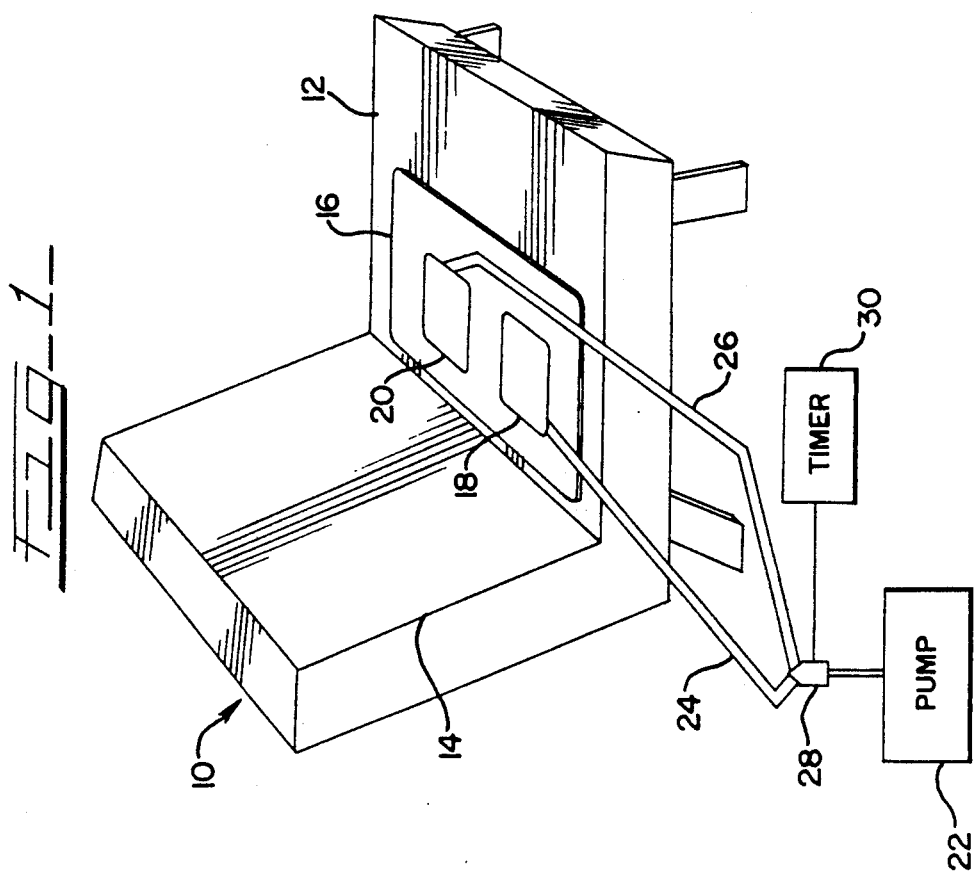
FIG. 1 illustrates a first embodiment of the seating device of the present invention utilizing inflation means.

FIG. 1 illustrates a seating apparatus 10 embodying a first embodiment of the device and method of the present invention. The seating apparatus 10 generally comprises a seat section 12 and a back section 14. A generally square-shaped flexible pad 16 houses a pair of right and left air bags 18 and 20. The flexible pad 16 is placed on the seat section of the seating apparatus such that the right air bag 18 is under the right hip of the user and the left air bag 20 is under the left hip of the user. Attachment means (not shown) may be added to secure the flexible pad 10 to the seat section 12. Acceptable attachment methods include the use of straps, or resealable nylon fabric that can be fastened on to itself, generally known by the tradename VELCRO. The air bags 18 and 20 are generally round-shaped, six inches in diameter when flat and capable of providing a one inch lift. A pressure relief valve (not shown) can be connected to each air bag and set for 4 psig, but is not required where a control valve as described herein is used. An air compressor or pump 22 provides air to each of the air bags 18 and 20 via a set of rubber hoses 24 and 26 leading from the air pump 22 to each air bag 18 and 20. The air pump 22 is a 10 watt capacity and provides a continuous compressed air supply. A suitable air pump is manufactured by Tetra Werke of West Germany and is commercially available under the name TETRA LUFT PUMP.

A control valve 28 is located across the rubber hoses 24 and 26 to control the flow of air into each air bag 18 and 20. A control valve suitable for the present application can be provided by most general mechanical hardware manufacturers. The preferred control valve 28 is available from Angar Scientific Corp. located in Roseland, N.J., and can be identified by part number 3V12A8. The control valve 28 is set for 30 psi and 12 VDC.

A timer 30 is attached to the control valve 28 to control the inflation of each air bag 18 and 20. The timer 30 may be of the electrical or mechanical type, although electric is generally preferred. An electric timer suitable for the present application can be provided by most general electronic device manufacturers. The preferred electric timer is available from The Northwestern University Chemical and Electrical Facility located in Evanston, Ill. The electric timer can allow an inflation period of 15 seconds for the right seat air bag 18 followed by a like inflation period for the left seat air bag 20. This cycle can be repeated continuously with the preferred range being from about 1 to about 12 cycles per minute. While one air bag is inflating, the other air bag is deflating due to the body weight resting on it.

Figure 2C:
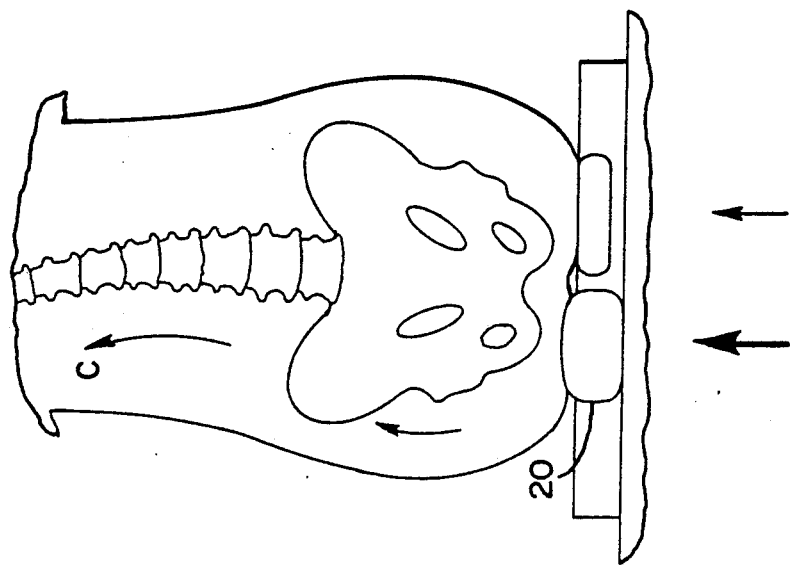
FIGS. 2a–2c illustrate a cross-section of the seating device of FIG. 1 taken along lines A—A. A user is shown seated in the device as the inflation means goes through a complete cycle.
Figure 2B:
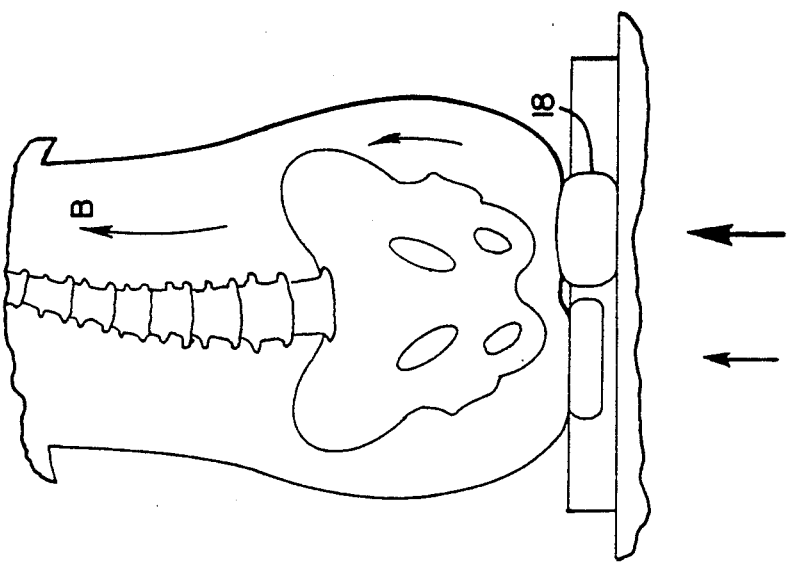
Figure 2A:
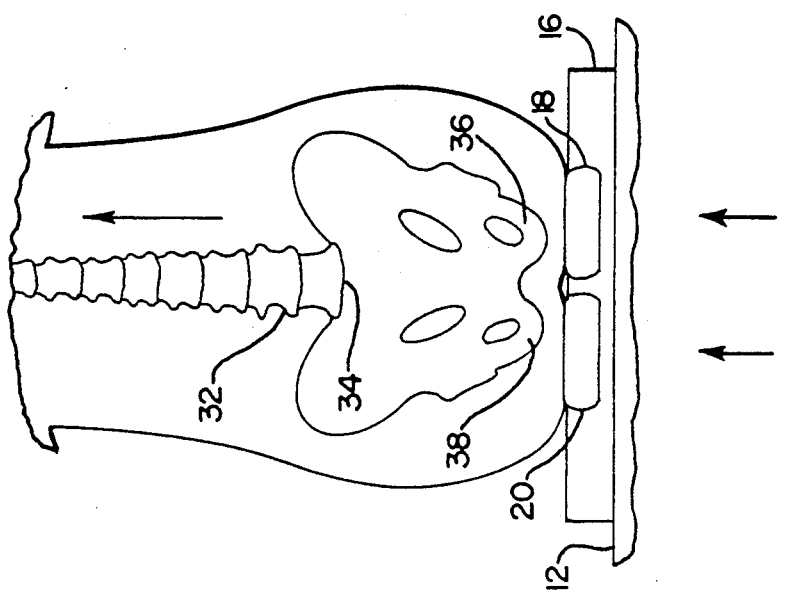

FIGS. 2a-2c illustrate the movement translated to the lower midsection of the user during operation of one inflation cycle for the seat air bags 18 and 20. First, the user sits down on the seat section 12, and the lower spine 32 is at rest on the pelvis 34. Air bag 18 can be centered directly under the right hip of the user and air bag 20 can be centered directly under the left hip of the user. More specifically, the air bags 18, 20 can be positioned to act directly on the down pointing ischium bones 36, 38 of the pelvis 34. The air bags are initially deflated. The air pump 22 is started and compressed air is presented at the control valve 28. The timer 30 first directs control valve 28 to open a path for compressed air through rubber hose 24 into air bag 18. As seen in FIG. 2b, the air bag 18 inflates for a predetermined period of time thereby lifting the right hip of the user a predetermined vertical or upward distance. This distance can vary greatly depending on the comfort zone of the user but is preferably in the range from about 5 millimeters to about 3 centimeters. The pelvis 34 tilts downward on the left side and the spine 32 tilts out in the direction of the left side. As soon as the spine starts its leftward tilt, the lower spine 32 spontaneously flexes or curves itself to the right as shown by directional line B. This lateral flexing effectively cancels the tendency of the upper body to move to the left and thus a stable upper body position is maintained.

The timer 30 then directs the control valve 28 to cut off the compressed air flow to air bag 18 and open a path for compressed air flow to air bag 20 via rubber hose 26. A bleeder valve feature (not shown) is attached to control valve 28 and provides a path for airflow from air bag 18 to the atmosphere for deflation of air bag 18 under the weight of the user. The bleeder valve leading to rubber hose 24 is activated when the control valve 28 is switched to rubber hose 26. As seen in FIG. 2c, the air bag 20 inflates for a predetermined period of time thereby lifting the left hip of the user a predetermined vertical or upward distance. This distance is also preferably in the range from about 5 millimeters to about 3 centimeters. A flexing action similar but opposite to what occurred for the left side, occurs for the right side as shown by directional line C. The timer 30 then directs the control valve 28 to cut off the compressed air flow to air bag 20 and open a path for compressed air flow to air bag 18 via rubber hose 24, thereby starting the cycle again. The bleeder valve feature leading to rubber hose 26 is activated when the control valve 28 is switched to rubber hose 24.

Figure 3:
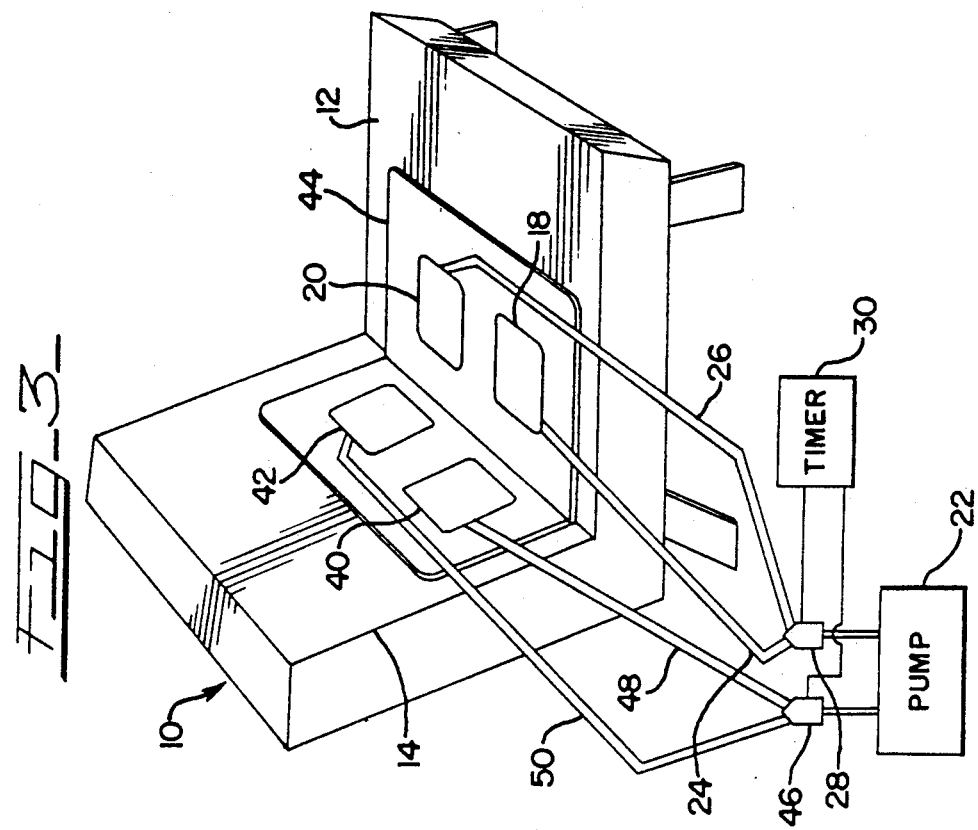
FIG. 3 illustrates a second embodiment of the seating device of the present invention utilizing inflation means.

FIG. 3 illustrates an alternative embodiment in which additional air bags 40 and 42 are added to the back section 14 of the seating apparatus 10. A generally square-shaped flexible pad 44 houses a set of four air bags 18, 20, 40 and 42, one located in each quadrant of the square flexible pad 44. The flexible pad 44 is placed on the seating apparatus 10 such that one half of the flexible pad is located on the seat section 12 and the other half is located on or against the back section 14. Thus, air bags 40 and 42 are located against the back section 14 and air bags 18 and 20 are located on the seat section 12. Attachment means (not shown) may be added to secure the flexible pad 44 to the seat section 12 and back section 14. Acceptable attachment methods include the use of straps, or resealable nylon fabric that can be fastened on to itself generally known by the tradename VELCRO. A pressure relief valve (not shown) can be connected to each air bag 18, 20, 40 and 42, and set for 4 psig, but is not required where a control valve as described herein is used.

A second control valve 46 identical to control valve 28 connects a second set of rubber hoses 48 and 50 to the air pump 22 to control the air flow into air bags 40 and 42. The timer 30 is also connected to control valve 46 to control the inflation of air bags 40 and 42. The timer 30 may be set for two cases at the preference of the user; (1) the inflation/deflation sequence for the right and left air bags 40 and 42 can follow the inflation/deflation sequence for the right and left air bags 18 and 20; or (2) the inflation/deflation sequence for the right and left air bags 40 and 42 can be opposite to the inflation/deflation sequence for the right and left air bags 18 and 20. Thus, as air bag 18 raises the right hip of the user air bag 40 pushes the right hip forward, or, when air bag 18 raises the right hip of the user air bag 42 pushes the left hip forward. This variable forward motion follows the forward motion imparted to the hips when a person is walking, thus further simulating the overall walking motion in a seated person. The forward distance can vary greatly depending on the comfort zone of the user but is preferably in the range from about 5 millimeters to about 3 centimeters.

The above-described invention defines both a device and method for translating motion to a seated person. The method involves the steps of periodically, rhythmically and continuously lifting and/or pushing forward, first one hip of a seated person and then the other hip. Thereby, some of the blood circulation and muscle stimulation which is normally attained through walking, can be attained while sitting. The anti-fatigue device and method of the present invention may be used in conjunction with any activity which involves sitting—particularly prolonged sitting. This would include driving an automobile or a truck, working in an office or operating machinery. An even greater benefit is derived in applications where the user is extremely sedentary such as when a person is confined to a wheelchair. Thus a person who cannot walk can still gain some of the benefits of walking.

While the above-described embodiments of the invention are preferred, those skilled in the art will recognize modifications of structure arrangement, composition and the like which do not part from the true scope of the invention. In particular, a separate flexible-pad may be used to house inflatable back air bags 40 and 42. Inflatable bags 18 and 20 or 40 and 42 may be built into the seat section 12 and back section 14 respectively rather than housed in a flexible pad. Also, the inflatable air bags could be formed from a single air bag having an interior wall separating the bag into left and right flatable compartments. As described earlier, the timer can be either a mechanical timing device or an electronic timing device. A suitably designed single control valve could replace the two control valves of the second embodiment. Further, the inflatable air bags could be replaced by a mechanical structure which may or may not rely on compressed air to alternately raise the hips of the seated person. For example, although more cumbersome than the inflated bags, a hydraulic piston and rod arrangement could periodically and alternately push a moveable panel or surface upward and forward against the hips of the seated person. Further still, the inflation cycle and distance for the back section and seat section may be varied greatly depending on the comfort zone of the seated person. The motion may be imperceptible to the user or may be quite pronounced.

I claim:

1. An ergonomic anti-fatigue device for moving the hips and lower midsection of a person seated in a seating apparatus having a seat section, the device comprising:
    inflatable compartment means comprising inflatable right and left compartments located on the seat section of the seating apparatus such that when the person is seated on the seat section said inflatable right compartment is located directly under the right hip of the person and said inflatable left compartment is located directly under the left hip of the person; and
    inflation and control means for inflating first one of said inflatable left and right compartments and then the other, thereby alternately lifting first one hip of the person and then the other hip, whereby motion and stimulation are translated to the person in a similar fashion to the motion and stimulation imparted to the person through walking.

2. The device defined in claim 1 wherein said inflatable right compartment is positioned under the right ischium bone of the person and said inflatable left compartment is positioned under the left ischium bone of the person.

3. An ergonomic anti-fatigue device for moving the hips and lower midsection of a person seated in a seating apparatus having a seat section, the device comprising:
    inflatable compartment means comprising inflatable right and left compartments, wherein said inflatable right and left compartments located on the seat section of the seating apparatus such that the person is seated on the seat section said inflatable right compartment is located directly under the right hip of the person and said inflatable left compartment is located directly under the left hip of the person, said inflatable right and left compartments each having an interior;
    inflation means connected to each of said inflatable right and left compartments for inflating said inflatable right and left compartments;
    release means connected to each of said inflatable right and left compartments and providing a path for airflow from said interior of said inflatable right and left compartments to the atmosphere when each of said inflatable right and left compartments is not being inflated; and
    inflation control means connected to said inflation means for controlling the inflation means to inflate first one of said inflatable right and left compartments and then the other, thereby alternately lifting first one hip of the person and then the other hip, whereby motion and stimulation are translated to the person in a similar fashion to the motion and stimulation imparted to the person through walking.

4. The device defined in claim 3 further having housing means for housing said inflatable compartment means, said housing means being capable of placement on the seat section of the seating apparatus.

5. The device defined in claim 4 wherein said housing means includes attachment means for attachment of said housing means to the seating apparatus.

6. The device defined in claim 4 wherein said housing means includes a flexible pad.

7. The device defined in claim 3 wherein said inflatable compartment means is are located inside the seat section of the seating apparatus.

8. The device defined in claim 3 wherein said inflatable compartment means is of a single inflatable compartment having a wall in the interior of said single inflatable compartment, separating said single inflatable compartment into two inflatable compartments, thereby forming said inflatable right and left compartments.

9. The device defined in claim 3 wherein said inflation means includes an air pump having hose means for transporting air to each of said inflatable right and left compartments.

10. The device defined in claim 3 wherein said release means includes a bleeder valve.

11. The device defined in claim 3 wherein said inflation control means includes a control valve having a bleeder valve feature, said bleeder valve providing said release means.

12. The device defined in claim 3 wherein said inflation control means includes an electronic timing device.

13. The device defined in claim 3 wherein said inflation control means includes a mechanical timing device.

14. The device defined in claim 3 wherein each of said inflatable right and left compartments is capable of alternately lifting each hip of the person a vertical distance of from about 5 millimeters to about 3 centimeters.

15. The device defined in claim 3 wherein the inflation of first one of said inflatable right and left compartments and then the other of said inflatable compartments comprises one cycle and said right and left inflation control means is capable of controlling said inflation means to generate from about 1 to about 12 cycles per minute.

16. An ergonomic anti-fatigue device for moving the hips and lower midsection of a person seated in a seating apparatus having a seat section and a back section, the device comprising:

inflatable compartment means comprising inflatable right and left seat compartments located on the seat section of the seating apparatus and inflatable right and left back compartments located on the back section of the seating apparatus, each of said inflatable right and left seat compartments and right and left back compartments having an interior, whereby when the person is seated on the seat section said inflatable right seat compartment is located directly under the right hip of the person and said inflatable left seat compartment is located directly under the left hip of the person, and said inflatable right back compartment is located behind the right hip of the person and said inflatable left back compartment is located behind the left hip of the person;

inflation means connected to each of said inflatable right and left seat compartments and right and left back compartments for inflating said inflatable right and left seat compartments and right and left back compartments;

release means connected to each of said inflatable right and left seat compartments and right and left back compartments and providing a path for airflow from said interior of said inflatable right and left seat compartments and right and left back compartments to the atmosphere when each of said inflatable right and left seat compartments and right and left back compartments is not being inflated; and inflation control means connected to said inflation means for controlling said inflation means, for inflating first one of said inflatable right and left seat compartments and then the other, thereby alternately lifting first one hip of the person and then the other hip, and said inflation control means also controlling said inflation means for inflating first one of said inflatable right and left back compartments and then the other, thereby alternately pushing forward first one hip of the person and then the other, whereby motion and stimulation are translated to the person in a similar fashion to the motion and stimulation imparted to the person through walking.

17. The device defined in claim 16 including housing means for housing said inflatable compartment means, said housing means being capable of placement on the seat section of the seating apparatus and against the back section, said housing means also having attachment means for attachment of said housing means to the seating apparatus.

18. The device defined in claim 17 wherein said housing means includes a flexible pad.

19. The device defined in claim 16 wherein said inflatable right and left seat compartments are located inside the seat section of the seating apparatus, and said inflatable right and left back compartments are located inside the back section of said seating apparatus.

20. The device defined in claim 16 wherein said inflatable compartment means is comprised two single inflatable compartments, each of said single inflatable compartments having a wall in the interior of said single inflatable compartment to separate said single inflatable compartment into two inflatable compartments, thereby forming said inflatable right and left seat compartments and said inflatable right and left back compartments.

21. The device defined in claim 16 wherein said inflation means includes an air pump having hose means for transporting air to each of said inflatable right and left seat compartments and right and left back compartments.

22. The device defined in claim 16 wherein said inflation control means includes an electronic timing device.

23. The device defined in claim 16 wherein said inflation control means includes a mechanical timing device.

24. The device defined in claim 16 wherein:
said inflation control means includes first and second control valves each having a bleeder valve feature, said bleeder valve providing said release means; and
said first control valve controls the inflation of said inflatable right and left seat compartments and said second control valve controls the inflation of said inflatable right and left back compartments.

25. The device defined in claim 16 wherein each of said inflatable right and left seat compartments is capable of alternately lifting each hip of the person an upward distance of from about 5 millimeters to about 3 millimeters.

26. The device defined in claim 16 wherein each of said inflatable right and left back compartments is capable of alternately lifting each hip of the person a forward distance of from about 5 millimeters to about 3 millimeters.

27. The device defined in claim 16 wherein the inflation of first one of said inflated right and left seat compartments and then the other, comprises one cycle, and said inflation control means is capable of controlling said inflation means to generate from about 1 to about 12 cycles per minute.

28. The device defined in claim 16 wherein said inflation control means is capable of inflating said inflatable left seat compartment at about the same time as said left back compartment and inflating said inflated right seat compartment at about the same time as said right back compartment.

29. The device defined in claim 16 wherein said inflation control means is capable of inflating said inflatable left seat compartment at about the same time as said right back compartment and inflating said inflatable right seat compartment at about the same time as said left back compartment.

30. An ergonomic anti-fatigue device for moving the hips and lower midsection of a person seated in a seating apparatus having a seat section, the device comprising:

moveable compartment means comprising moveable left and right compartments located on the seat section of the seating apparatus such that when the person is seated on the seat section said moveable right compartment is located directly under the right hip of the person and said moveable left compartment is located directly under the left hip of the person, each of said moveable left and right compartments having a rest position; and movement and control means connected to each of said moveable left and right compartments for moving first one of said moveable left and right compartments upward against the person and back to said rest position, then moving the other of said moveable left and right compartments upward against the person and back to said rest position, thereby alternately lifting first one hip of the person and then the other hip, whereby motion and stimulation are translated to the person in a similar fashion to the motion and stimulation imparted to the person through walking.

31. The device defined in claim 30 wherein said moveable compartment means is located inside the seat section of the seating apparatus.

32. The device defined in claim 30 wherein said movement and control means includes an electronic timing device.

33. The device defined in claim 30 wherein said movement and control means includes a mechanical timing device.

34. The device defined in claim 30 wherein each of said moveable left and right compartments is capable of lifting each hip of the person an upward distance of from about 5 millimeters to about 3 millimeters.

35. The device defined in claim 30 wherein the movement of first one of said moveable left and right compartments and then the other comprises one cycle, and said movement and control means is capable of controlling said moveable compartments to generate from about 1 to about 12 cycles per minute.

36. An ergonomic anti-fatigue device for moving the hips and lower midsection of a person seated in a seating apparatus having a seat section and a back section, the device comprising:

moveable compartment means comprising moveable right and left seat compartments located on the seat section of the seating apparatus and moveable right and left back compartments located on the back section of the seating apparatus, each of said moveable right and left seat compartments and right and left back compartments having a rest position, whereby when the person is seated on the seat section said moveable right seat compartment is located directly under the right hip of the person and said moveable left seat compartment is located directly under the left hip of the person, and said moveable right back compartment is located behind the right hip of the person and said moveable left back compartment is located behind the left hip of the person; and movement and control means connected to each of said moveable right and left seat compartments and right and left back compartments for moving first one of said moveable right and left seat compartments upward against the person and back to said rest position, thereby alternately lifting first one hip of the person and then the other hip, and said movement and control means also moving first one of said moveable right and left back compartments forward against the person and back to said rest position, then moving the other of said moveable right and left back compartments forward against the person and back to said rest position, thereby alternately pushing forward first one hip of the person and then the other hip, whereby motion and stimulation are translated to the person in a similar fashion to the motion and stimulation imparted to the person through walking.

37. The device defined in claim 36 wherein said moveable right and left seat compartments are located inside the seat section of the seating apparatus, and said moveable right and left back compartments are located inside the back section of the seating apparatus.

38. The device defined in claim 36 wherein said movement and control means includes an electronic timing device.

39. The device defined in claim 36 wherein said movement and control means includes a mechanical timing device.

40. The device defined in claim 36 wherein each of said moveable right and left seat compartments is capable of alternately lifting each hip of the person an upward distance of from about 5 millimeters to about 3 centimeters.

41. The device defined in claim 36 wherein each of said moveable right and left back compartments is capable of alternately moving each hip of the person a forward distance of from about 5 millimeters to about 3 centimeters.

42. The device defined in claim 36 wherein the movement of first one of said moveable right and left seat compartments and then the other, comprises one cycle and said movement and control means is capable of controlling said movable right and left seat compartments to generate from about 1 to about 12 cycles per minute.

43. The device defined in claim 36 wherein said movement and control means is capable of moving said moveable left seat compartment at about the same time as said left back compartment and moving said moveable right seat compartment at about the same time as said right back compartment.

44. The device defined in claim 36 wherein said movement and control means is capable of moving said moveable left seat compartment at about the same time as said right back compartment and moving said moveable right seat compartment at about the same time as said left back compartment.

45. A method for moving the hips and lower midsection of a person seated in a seating apparatus, comprising the steps of;

providing inflatable right and left compartments such that when the person is seated on the seating apparatus said inflatable right compartment is located directly under the right hip of the person, and said inflatable left compartment is located directly under the left hip of the person, each of said inflatable right and left compartments having an interior;

providing inflation means for inflating said inflatable right and left compartments;

providing release means connected to each of said inflatable right and left compartments for providing a path for air flow from said interior of said inflatable right and left compartments to the atmosphere when each of said inflatable right and left compartments is not being inflated; and activating said inflation means in order to inflate first one of said inflatable right and left compartments and then the other of said inflatable right and left compartments, thereby alternately lifting first one hip of the person and then the other hip of the person, whereby motion and stimulation are translated to the person in a similar fashion to the motion and stimulation imparted to the person through walking.

46. The method defined in claim 45 wherein each of said inflatable right and left compartments is capable of alternately lifting each hip of the person an upward distance of from about 5 millimeters to about 3 centimeters.

47. The method defined in claim 45 wherein the inflation of first one of said inflatable right and left compartment and then the other comprises one cycle, and said cycle is repeated from about 1 to about 12 time per minute.

48. A method for moving the hips and lower midsection of a person seated in a seating apparatus having a seat section and a back section, the steps comprising:

providing inflatable right and left seat compartments located on the seat section of the seating apparatus such that when the person is seated on the seat section said inflatable right seat compartment is located directly under the right hip of the person, and said inflatable left seat compartment is located directly under the left hip of the person, each of said inflatable right and left seat compartments having an interior;

providing inflatable right and left back compartments located on the back section of the seating apparatus such that when the person is seated on the seat section said inflatable right back compartment is located behind the right hip of the person and said inflatable left back compartment is located behind under the left hip of the person, each of said inflatable right and left back compartments having an interior;

providing inflation means connected to each of said inflatable right and left seat compartments and right and left back compartments for inflating said inflatable right and left seat compartments and right and left back compartments; and inflating first one of said inflatable right and left seat compartments and then the other, thereby alternately lifting first one hip of the person and then the other hip, and inflating first one of said inflatable right and left back compartments and then the other, thereby alternately pushing forward first one hip of the person and then the other hip; whereby motion and stimulation are translated to the person in a similar fashion to the motion and stimulation imparted to the person through walking.

49. The method described in claim 48 including the steps of locating said inflatable right and left seat compartments inside the seat section of the seating apparatus, and locating said inflatable right and left back compartments inside the back section of the seating apparatus.

50. The method described in claim 48 wherein each of said inflatable right and left seat compartments is capable of lifting each hip of the person an upward distance of from about 5 millimeters to about 3 centimeters, and each of said right and left back compartments is capable of moving each hip of the person a forward distance of from about 5 millimeters to about 3 centimeters.

51. The method described in claim 48 wherein the inflation of first one of said inflatable right and left seat compartments and then the other comprises one cycle and said cycle is repeated from about 1 to about 12 times per minute.

52. A method for moving the hips and lower midsection of a person seated in a seating apparatus, comprising the steps of, providing right and left movable compartments such that when the person is seated on the seating apparatus said movable right compartment is located directly under the right hip of the person, and said movable left compartment is located directly under the left hip of the person, each of said movable right and left compartments having a rest position;

providing movement means connected to each of said movable right and left compartments for moving said movable right and left compartments; and moving first one of said movable right and left compartments upward against the person and then back to said rest position, then moving the other of said movable right and left compartments upward against the person and then back to said rest position, thereby alternately lifting first one hip of the person and then the other hip of the person, whereby motion and stimulation are translated to the person in a similar fashion to the motion and stimulation imparted to the person through walking.

53. The method defined in claim 52 wherein each of said moveable right and left compartments is capable of alternately lifting each hip of the person an upward distance of from about 5 millimeters to about 3 centimeters.

54. The method defined in claim 52 wherein the movement of first one of said moveable right and left compartments and then the other comprises one cycle, and said cycle is repeated from about 1 to about 12 times per minute.

55. A method for moving the hips and lower midsection of a person seated in a seating apparatus having a seat section and a back section, the steps comprising providing moveable right and left seat compartments located on the seat section of the seating apparatus such that when the person is seated on the seat section said movable right seat compartment is located directly under the right hip of the person, and said moveable left seat compartment is located directly under the left hip of the person, each of said moveable right and left seat compartments having a rest position;

providing moveable right and left back compartments located on the back section of the seating apparatus such that when the person is seated on the seat section said moveable right back compartment is located behind the right hip of the person and said moveable left back compartment is located behind under the left hip of the person, each of said moveable right and left back compartments having a rest position;

providing movement means connected to each of said moveable right and left seat compartments and right and left back compartments for moving said moveable right and left seat compartments and right and left back compartments;

moving first one of said moveable right and left seat compartments upward against the person and back to said rest position, then moving the other of said moveable right and left seat compartments upward against the person and back to said rest position, thereby alternately lifting first one hip of the person and then the other hip, and moving first one of said moveable right and left back compartments forward against the person and back to said rest position, then moving the other of said moveable right and left back compartments forward against the person and back to said rest position, thereby alternately pushing forward first one hip of the person and then the other hip; whereby motion and stimulation are translated to the person in a similar fashion to the motion and stimulation imparted to the person through walking.

56. The method described in claim 53 wherein said moveable right and left seat compartments located inside the seat section of the seating apparatus, and said moveable right and left back compartments located inside the back section of the seating apparatus.

57. The method described in claim 55 wherein each of said moveable right and left seat compartments is capable of alternately lifting each hip of the person an upward distance of from about 5 millimeters to about 3 centimeters, and each of said moveable right and left back compartments is capable of alternately moving each hip of the person a forward distance of from about 5 millimeters to about 3 centimeters.

58. The method described in claim 55 wherein the upward movement of first one moveable right and left seat compartment and then the other moveable right and left seat compartment comprises one cycle and said cycle is repeated from about 1 to about 12 time per minute.

* * * * *

UNITED STATES PATENT AND TRADEMARK OFFICE
CERTIFICATE OF CORRECTION

PATENT NO. : 5,022,385

DATED : June 11, 1991

INVENTOR(S) : Richard D. Harza

It is certified that error appears in the above-identified patent and that said Letters Patent is hereby corrected as shown below:

In column 1, line 68, after "Morrell" please delete --.-- and substitute therefor --,--.

In column 4, line 54, after "itself" please insert --,--.

COLUMN 6

In claim 3, line 18, before "located" please insert --are;
line 19, after "that" please insert --when--.

In claim 7, line 55, before "located" please delete "are".

COLUMN 7

In claim 16, line 65, after "other" please insert --hip--.

COLUMN 8

In claim 20, line 16, before "two" please insert --of--.
In claim 25, line 45, please delete "millimeters" and substitute therefor --centimeters--.
In claim 26, line 48, please delete "lifting" and substitute therefor --moving--; line 50, please delete "millimeters" and substitute therefor --centimeters--.
In claim 27, line 52, please delete "inflated" and substitute therefor --inflatable--.
In claim 28, line 59, after "said" please insert --inflatable--; line 60, please delete "inflated" and substitute therefor inflatable--; line 61, before "right" please insert --inflatable--.
In claim 29, line 66, before "right" Please insert --inflatable--; line 68, before "left" please insert --inflatable--.

COLUMN 9

In claim 34, line 37, please delete the second occurrence of "millimeters" and substitute therefor --centimeters--.

UNITED STATES PATENT AND TRADEMARK OFFICE
CERTIFICATE OF CORRECTION

PATENT NO. : 5,022,385

DATED : June 11, 1991

INVENTOR(S) : Richard D. Harza

It is certified that error appears in the above-identified patent and that said Letters Patent is hereby corrected as shown below:

COLUMN 10

In claim 36, line 1, before "thereby" please insert --then moving the other of said moveable right and left seat compartments upward against the person and back to said rest position, then moving the other of said moveable right and left seat compartments upward against the person and back to said rest position,--.

In claim 43, line 45, before "left" please insert --movable--; line 47, before "right" please insert --movable--.

In claim 44, line 51, before "right" please insert --movable--; line 53, before "left" please insert --movable--.

COLUMN 11

In claim 47, lines 20 and 21, please delete "compartment" delete "time" and substitute therefor --times--.

COLUMN 12

In claim 52, line 13, please delete "," and substitute therefor --:--.

In claim 55, line 47, after "comprising" please insert --:--; line 63, please delete "under".

UNITED STATES PATENT AND TRADEMARK OFFICE
CERTIFICATE OF CORRECTION

PATENT NO. : 5,022,385

DATED : June 11, 1991

INVENTOR(S) : Richard D. Harza

It is certified that error appears in the above-identified patent and that said Letters Patent is hereby corrected as shown below:

COLUMN 14

In claim 58, line 18, please delete "time" and substitute therefor --times--.

Signed and Sealed this

Sixth Day of July, 1993

*Attest:*

MICHAEL K. KIRK

*Attesting Officer*     *Acting Commissioner of Patents and Trademarks*

REEXAMINATION CERTIFICATE (3786th)
United States Patent [19]
Harza

[11] B1 5,022,385
[45] Certificate Issued Jun. 22, 1999

[54] ERGONOMIC ANTI-FATIGUE SEATING DEVICE AND METHOD

[76] Inventor: Richard D. Harza, 655 Sheridan Rd., Winnetka, Ill. 60093

Reexamination Request:
No. 90/004,808, Oct. 22, 1997

Reexamination Certificate for:
| | |
|---|---|
| Patent No.: | 5,022,385 |
| Issued: | Jun. 11, 1991 |
| Appl. No.: | 07/430,806 |
| Filed: | Nov. 2, 1989 |

Certificate of Correction issued Jul. 6, 1993.

[51] Int. Cl.$^6$ ........................................ A61H 1/60
[52] U.S. Cl. ........................................ 601/149
[58] Field of Search ........................ 601/5, 23, 24, 601/26, 43, 48, 89–91, 96–98, 100, 105, 148–150; 297/284.1, 284.3, 284.6, DIG. 3

[56] References Cited

U.S. PATENT DOCUMENTS

| | | |
|---|---|---|
| D. 142,682 | 10/1945 | Weill . |
| 1,253,229 | 1/1918 | Guilford . |
| 1,772,310 | 8/1930 | Hart . |
| 2,044,691 | 6/1936 | Höflinger . |
| 2,245,909 | 6/1941 | Enfiajian . |
| 2,361,242 | 10/1944 | Rosett . |
| 2,684,672 | 7/1954 | Summerville . |
| 2,719,571 | 10/1955 | Taylor . |
| 2,731,074 | 1/1956 | Steinle . |
| 2,799,323 | 7/1957 | Berg . |
| 2,808,828 | 10/1957 | Rubin . |
| 2,819,712 | 1/1958 | Morrison . |
| 2,856,147 | 10/1958 | Knapp . |
| 2,943,620 | 7/1960 | Sibert . |
| 2,944,591 | 7/1960 | Morrill, Jr. . |
| 2,998,817 | 9/1961 | Armstrong . |
| 3,008,465 | 11/1961 | Gal . |
| 3,080,195 | 3/1963 | Berg . |
| 3,148,391 | 9/1964 | Whitney . |
| 3,186,008 | 6/1965 | Fuller . |
| 3,199,124 | 8/1965 | Grant . |
| 3,270,440 | 9/1966 | Radosevic, Jr. . |
| 3,297,023 | 1/1967 | Foley . |
| 3,446,203 | 5/1969 | Murray . |
| 3,477,071 | 11/1969 | Emerson . |
| 3,483,862 | 12/1969 | Takeuchi . |
| 3,485,240 | 12/1969 | Fountain . |
| 3,492,988 | 2/1970 | De Mare . |
| 3,580,634 | 5/1971 | Bock . |
| 3,595,223 | 7/1971 | Castagna . |
| 3,613,671 | 10/1971 | Poor . |
| 3,641,995 | 2/1972 | Brandt . |
| 3,659,897 | 5/1972 | Wright . |
| 3,674,019 | 7/1972 | Grant . |
| 3,678,520 | 7/1972 | Evans . |
| 3,749,442 | 7/1973 | Berg et al. . |
| 3,760,801 | 9/1973 | Borgeas . |
| 3,862,629 | 1/1975 | Rotta . |
| 3,867,732 | 2/1975 | Morrell . |

(List continued on next page.)

FOREIGN PATENT DOCUMENTS

| | | |
|---|---|---|
| 1115421 | 10/1961 | Germany . |
| 32 00 139 | 10/1982 | Germany . |
| 1457227 | 12/1976 | United Kingdom . |
| 1554107 | 10/1979 | United Kingdom . |
| WO 85/05028 | 11/1985 | WIPO . |

OTHER PUBLICATIONS

Cynthia Norkin and Pamela Levangie, Joint Structure and Function, 2d ed. 1992, Chapter 14 entitled "Gait", pp. 460–469.

Hage, Michael, "Analysis of the sit–man device", 1993.

Inman, "Human Walking", 1981, pp. 1–21.

*Primary Examiner*—Joe H. Cheng

[57] ABSTRACT

A method and apparatus is disclosed for periodically and rhythmically lifting first one hip of a seated person and then the other, thereby simulating the muscle stimulation and relaxation imparted to the person through walking while the person is seated. Inflatable air bags provide lift to the seated person while an electric timer and control valve control the timing and distance of inflation.

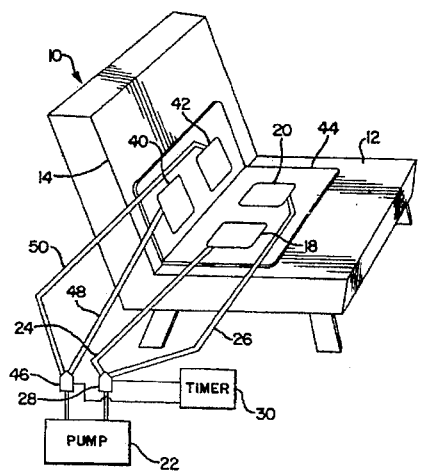

U.S. PATENT DOCUMENTS

| | | |
|---|---|---|
| 3,976,056 | 8/1976 | Brawn . |
| 4,028,753 | 6/1977 | Rios . |
| 4,029,087 | 6/1977 | Dye et al. . |
| 4,047,757 | 9/1977 | Eames et al. . |
| 4,068,334 | 1/1978 | Randall . |
| 4,152,795 | 5/1979 | Rodosta et al. . |
| 4,175,297 | 11/1979 | Robbins et al. . |
| 4,300,249 | 11/1981 | Taylor . |
| 4,320,746 | 3/1982 | Arkans et al. . |
| 4,375,217 | 3/1983 | Arkans . |
| 4,402,312 | 9/1983 | Villari et al. . |
| 4,405,139 | 9/1983 | Kawahard . |
| 4,408,599 | 10/1983 | Mummert . |
| 4,444,430 | 4/1984 | Yoshida et al. . |
| 4,515,337 | 5/1985 | Torras . |
| 4,552,402 | 11/1985 | Huber et al. . |
| 4,552,404 | 11/1985 | Congleton . |
| 4,570,676 | 2/1986 | Nishio et al. . |
| 4,583,522 | 4/1986 | Aronne . |
| 4,592,588 | 6/1986 | Isono et al. . |
| 4,655,505 | 4/1987 | Kashiwamura et al. . |
| 4,688,851 | 8/1987 | Whiteford . |
| 4,722,550 | 2/1988 | Imaoka et al. . |
| 4,796,948 | 1/1989 | Paul et al. . |
| 4,826,247 | 5/1989 | McGrady et al. . |
| 4,832,407 | 5/1989 | Serber . |
| 4,833,614 | 5/1989 | Saitoh et al. . |
| 4,840,425 | 6/1989 | Noble . |
| 4,860,733 | 8/1989 | Parker, Jr. . |
| 4,881,285 | 11/1989 | Zeeb . |
| 4,890,886 | 1/1990 | Opsvik . |
| 4,915,124 | 4/1990 | Sember, III . |
| 4,986,260 | 1/1991 | Iams et al. . |
| 5,022,708 | 6/1991 | Nordella et al. . |
| 5,024,485 | 6/1991 | Berg et al. . |
| 5,035,466 | 7/1991 | Mathews et al. . |
| 5,054,739 | 10/1991 | Wallin . |
| 5,082,327 | 1/1992 | Crisp . |
| 5,088,473 | 2/1992 | Chen et al. . |
| 5,113,851 | 5/1992 | Gamba . |
| 5,116,100 | 5/1992 | Iversen . |
| 5,135,282 | 8/1992 | Pappers . |
| 5,197,461 | 3/1993 | Petajan et al. . |
| 5,242,356 | 9/1993 | Grenfell . |
| 5,280,997 | 1/1994 | Andres et al. . |
| 5,288,127 | 2/1994 | Berg et al. . |
| 5,362,302 | 11/1994 | Jensen et al. . |
| 5,433,506 | 7/1995 | Jensen . |
| 5,662,384 | 9/1997 | O'Neill et al. . |
| 5,678,891 | 10/1997 | O'Neill et al. . |

B1 5,022,385

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 14, 25, 34, 40, 46 and 53 are cancelled.

Claims 1, 3, 16, 30, 36, 45, 48, 50, 52 and 55–57 are determined to be patentable as amended.

Claims 2, 4–13, 15, 17–24, 26–29, 31–33, 35, 37–39, 41–44, 47, 49, 51, 54 and 58, dependent on an amended claim, are determined to be patentable.

New claims 59–150 are added and determined to be patentable.

1. An ergonomic anti-fatigue device for moving the hips and lower midsection of a person seated in a seating apparatus having a seat section, the device comprising:
    inflatable compartment means comprising inflatable right and left compartments located on the seat section of the seating apparatus such that when the person is seated on the seat section said inflatable right compartment is located directly under the right hip of the person and said inflatable left compartment is located directly under the left hip of the person; and
    inflation and control means for inflating first one of said inflatable left and right compartments and then the other, thereby alternately lifting first one hip of the person and then the other hip, *each of said inflatable right and left compartments being capable of alternately lifting each hip of the person an upward distance of from about 5 millimeters to about 3 centimeters,* whereby motion and stimulation are translated to the person in a similar fashion to the motion and stimulation imparted to the person through walking.

3. An ergonomic anti-fatigue device for moving the hips and lower midsection of a person seated in a seating apparatus having a seat section, the device comprising:
    inflatable compartment means comprising inflatable right and left compartments, wherein said inflatable right and left compartments are located on the seat section of the seating apparatus such that when the person is seated on the seat section said inflatable right compartment is located directly under the right hip of the person and said inflatable left compartment is located directly under the left hip of the person, said inflatable right and left compartments each having an interior;
    inflation means connected to each of said inflatable right and left compartments for inflating said inflatable right and left compartments;
    release means connected to each of said inflatable right and left compartments and providing a path for airflow from said interior of said inflatable right and left compartments to the atmosphere when each of said inflatable right and left compartments is not being inflated; and
    inflation control means connected to said inflation means for controlling the inflation means to inflate first one of said inflatable right and left compartments and then the other, thereby alternately lifting first one of hip of the person and then the other hip, *each of said inflatable right and left compartments being capable of alternately lifting each hip of the person an upward distance of from about 5 millimeters to about 3 centimeters,* whereby motion and stimulation are translated to the person in a similar fashion to the motion and stimulation imparted to the person through walking.

16. An ergonomic anti-fatigue device for moving the hips and lower midsection of a person seated in a seating apparatus having a seat section and a back section, the device comprising:
    inflatable compartment means comprising inflatable right and left seat compartments located on the seat section of the seating apparatus and inflatable right and left back compartments located on the back section of the seating apparatus, each of said inflatable right and left seat compartments and right and left back compartments having an interior, whereby when the person is seated on the seat section said inflatable right seat compartment is located directly under the right hip of the person and said inflatable left seat compartment is located directly under the left hip of the person, and said inflatable right back compartment is located behind the right hip of the person and said inflatable left back compartment is located behind the left hip of the person;
    inflation means connected to each of said inflatable right and left seat compartments and right and left back compartments for inflating from said inflatable right and left seat compartments and right and left back compartments;
    release means connected to each of said inflatable right and left seat compartments and right and left back compartments and providing a path for airflow from said interior of said inflatable right and left seat compartments and right and left back compartments to the atmosphere when each of said inflatable right and left seat compartments and right and left back compartments is not being inflated; and
    inflation control means connected to said inflation means for controlling said inflation means, for inflating first one of said inflatable right and left seat compartments and then the other, thereby alternately lifting first one hip of the person and then the other hip, *each of said inflatable right and left seat compartments being capable of alternately lifting each hip of the person an upward distance of from about 5 millimeters to about 3 centimeters,* and said inflation control means also controlling said inflation means for inflating first one of said inflatable right and left back compartments and then the other, thereby alternately pushing forward first one hip of the person and then the other hip, whereby motion and stimulation are translated to the person in a similar fashion to the motion and stimulation imparted to the person through walking.

30. An ergonomic anti-fatigue device for moving the hips and lower midsection of a person seated in a seating apparatus having a seat section, the device comprising:
    moveable compartment means comprising moveable left and right compartments located on the seat section of the seating apparatus such that when the person is seated on the seat section said moveable right compartment is located directly under the right hip of the person and said moveable left compartment is located directly under the left hip of the person, each of said moveable left and right compartments having a rest position; and movement and control means connected to each of said moveable left and right compartments for moving first one of said moveable left and right compartments upward against the person and back to said rest position, then moving the other of said moveable left and right compartments upward against the person and back to said rest position, thereby alternately lifting first one hip of the person and then the other hip, *each of said moveable left and right compartments being capable of lifting each hip of the person an upward distance of from about 5 millimeters to about 3 centimeters,* whereby motion and stimulation are translated to the person in a similar fashion to the motion and stimulation imparted to the person through walking.

36. An ergonomic anti-fatigue device for moving the hips and lower midsection of a person seated in a seating apparatus having a seat section and a back section, the device comprising:

moveable compartment means comprising moveable right and left seat compartments located on the seat section of the seating apparatus and moveable right and left back compartments located on the back section of the seating apparatus, each of said moveable right and left seat compartments and right and left back compartments having a rest position, whereby when the person is seated on the seat section said moveable right seat compartment is located directly under the right hip of the person and said moveable left seat compartment is located directly under the left hip of the person, and said moveable right back compartment is located behind the right hip of the person and said moveable left back compartment is located behind the left hip of the person; and movement and control means connected to each of said moveable right and left seat compartments and right and left back compartments for moving first one of said moveable right and left seat compartments upward against the person and back to said rest position, then moving the other of said moveable right and left seat compartments upward against the person and back to said rest position, [then moving the other of said moveable right and left seat compartments upward against the person and back to said rest position,] thereby alternately lifting first one hip of the person and then the other hip, *each of said moveable right and left seat compartments being capable of alternately lifting each hip of the person an upward distance of from about 5 millimeters to about 3 centimeters,* and said movement and control means also moving first one of said moveable right and left back compartments forward against the person and back to said rest position, then moving the other of said moveable right and left back compartments forward against the person and back to said rest position, thereby alternately pushing forward first one hip of the person and then the other hip, whereby motion and stimulation are translated to the person in a similar fashion to the motion and stimulation imparted to the person through walking.

45. A method for moving the hips and lower midsection of a person seated in a seating apparatus, comprising the steps of:

providing inflatable right and left compartments such that when the person is seated on the seating apparatus said inflatable right compartment is located directly under the right hip of the person, and said inflatable left compartment is located directly under the left hip of the person, each of said inflatable right and left compartments having an interior;

providing inflation means for inflating said inflatable right and left compartments;

providing release means connected to each of said inflatable right and left compartments for providing a path for air flow from said interior of said inflatable right and left compartments to the atmosphere when each of said inflatable right and left compartments is not being inflated; and activating said inflation means in order to inflate first one of said inflatable right and left compartments and then the other of said inflatable right and left compartments, thereby alternately lifting first one hip of the person and then the other hip of the person, *each of said inflatable right and left compartments being capable of alternately lifting each hip of the person an upward distance of from about 5 millimeters to about 3 centimeters,* whereby motion and stimulation are translated to the person in a similar fashion to the motion and stimulation imparted to the person through walking.

48. A method for moving the hips and lower midsection of a person seated in a seating apparatus having a seat section and a back section, the steps comprising:

providing inflatable right and left seat compartments located on the seat section of the seating apparatus such that when the person is seated on the seat section said inflatable right seat compartment is located directly under the right hip of the person, and said inflatable left seat compartment is located directly under the left hip of the person, each of said inflatable right and left seat compartments having an interior;

providing inflatable right and left back compartments located on the back section of the seating apparatus such that when the person is seated on the seat section said inflatable right back compartment is located behind the right hip of the person and said inflatable left back compartment is located behind [under] the left hip of the person, each of said inflatable right and left back compartments having an interior;

providing inflation means connected to each of said inflatable right and left seat compartments and right and left back compartments for inflating said inflatable right and left seat compartments and right and left back compartments; and inflating first one of said inflatable right and left seat compartments and then the other, thereby alternately lifting first one hip of the person and then the other hip, *each of said inflatable right and left seat compartments being capable of lifting each hip of the person an upward distance of from about 5 millimeters to about 3 centimeters,* and inflating first one of said inflatable right and left back compartments and then the other, thereby alternately pushing forward first one hip of the person and then the other hip[;], whereby motion and stimulation are translated to the person in a similar fashion to the motion and stimulation imparted to the person through walking.

50. The method described in claim 48 wherein [each of said inflatable right and left seat compartments is capable of lifting each hip of the person an upward distance of from about 5 millimeters to about 3 centimeters, and] each of said right and left back compartments is capable of moving each hip of the person a forward distance of from about 5 millimeters to about 3 centimeters.

52. A method for moving the hips and lower midsection of a person seated in a seating apparatus, comprising the steps of:

providing right and left movable compartment such that when the person is seated on the seating apparatus said movable right compartment is located directly under the right hip of the person, and said movable left compartment is located directly under the left hip of the person, each of said movable right and left compartments having a rest position;

providing movement means connected to each of said movable right and left compartments for moving said movable right and left compartments; and moving first one of said movable right and left compartments upward against the person and then back to said rest position, then moving the other of said movable right and left compartments upward against the person and then back to said rest position, thereby alternately lifting first one hip of the person and then the other hip of the person, *each of said moveable right and left compartments being capable of alternately lifting each hip of the person an upward distance of from about 5 millimeters to about 3 centimeters,* whereby motion and stimulation are translated to the person in a similar fashion to the motion and stimulation imparted to the person through walking.

55. A method for moving the hips and lower midsection of a person seated in a seating apparatus having a seat section and a back section, the steps comprising:

providing moveable right and left seat compartments located on the seat section of the seating apparatus such that when the person is seated on the seat section said moveable right seat compartment is located directly under the right hip of the person, and said moveable left compartment is located directly under the left hip of the person, each of said moveable right and left seat compartments having a rest position;

providing moveable right and left back compartments located on the back section of the seating apparatus such that when the person is seated on the seat section said moveable right back compartment is located behind the right hip of the person and said moveable left back compartment is located behind the left hip of the person, each of said moveable right and left back compartments having a rest position;

providing movement means connected to each of said moveable right and left seat compartments and right and left back compartments for moving said moveable right and left seat compartments and right and left back compartments;

moving first one of said moveable right and left seat compartments upward against the person and back to said rest position, then moving the other of said moveable right and left seat compartments upward against the person and back to said rest position, thereby alternately lifting first one hip of the person and then the other hip, *each of said moveable right and left seat compartments being capable of alternately lifting each hip of the person an upward distance of from about 5 millimeters to about 3 centimeters,* and moving first one of said moveable right and left back compartments forward against the person and back to said rest position, then moving the other of said moveable right and left back compartments forward against the person and back to said rest position, thereby alternately pushing forward first one hip of the person and then the other hip, whereby motion and stimulation are translated to the person in a similar fashion to the motion and stimulation imparted to the person through walking.

56. The method described in claim [53] *55* wherein said moveable right and left seat compartments located inside the seat section of the seating apparatus, and said moveable right and left back compartments located inside the back section of the seating apparatus.

57. The method described in claim 55 wherein [each of said moveable right and left seat compartments is capable of alternately lifting each hip of the person an upward distance of from about 5 millimeters to about 3 centimeters, and] each of said moveable right and left back compartments is capable of alternately moving each hip of the person a forward distance of from about 5 millimeters to about 3 centimeters.

*59. An ergonomic anti-fatigue device for moving the hips and lower midsection of a person seated in a seating apparatus having a seat section and a back section, the device comprising:*

*inflatable compartment means comprising inflatable right and left seat compartments located on the seat section of the seating apparatus and inflatable right and left back compartments located on the back section of the seating apparatus, each of said inflatable right and left seat compartments and right and left back compartments having an interior, whereby when the person is seated on the seat section said inflatable right seat compartment is located directly under the right hip of the person and said inflatable left seat compartment is located directly under the left hip of the person, and said inflatable right back compartment is located behind the right hip of the person and said inflatable left back compartment is located behind the left hip of the person;*

*inflation means connected to each of said inflatable right and left seat compartments and right and left back compartments for inflating said inflatable right and left seat compartments and right and left back compartments;*

*release means connected to each of said inflatable right and left seat compartments and right and left back compartments and providing a path for airflow from said interior of said inflatable right and left seat compartments and right and left back compartments to the atmosphere when each of said inflatable right and left seat compartments and right and left back compartments is not being inflated; and*

*inflation control means connected to said inflation means for controlling said inflation means, for inflating first one of said inflatable right and left seat compartments and then the other, thereby alternately lifting first one hip of the person and then the other hip, and said inflation control means also controlling said inflation means for inflating first one of said inflatable right and left back compartments and then the other, thereby alternately pushing forward first one hip of the person and then the other hip, each of said inflatable right and left back compartments being capable of alternately moving each hip of the person a forward distance of from about 5 millimeters to about 3 centimeters, whereby motion and stimulation are translated to the person in a similar fashion to the motion and stimulation imparted to the person through walking.*

60. The device defined in claim 59 including housing means for housing said inflatable compartment means, said housing means being capable of placement on the seat section of the seating apparatus and against the back section, said housing means also having attachment means for attachment of said housing means to the seating apparatus.

61. The device defined in claim 60 wherein said housing means includes a flexible pad.

62. The device defined in claim 59 wherein said inflatable right and left seat compartments are located inside the seat section of the seating apparatus, and said inflatable right and left back compartments are located inside the back section of said seating apparatus.

63. The device defined in claim 59 wherein said inflatable compartment means is comprised of two single inflatable compartments, each of said single inflatable compartments having a wall in the interior of said single inflatable compartment to separate said single inflatable compartment into two inflatable compartments, thereby forming said inflatable right and left seat compartments and said inflatable right and left back compartments.

64. The device defined in claim 59 wherein said inflation means includes an air pump having hose means for transporting air to each of said inflatable right and left seat compartments and right and left back compartments.

65. The device defined in claim 59 wherein said inflation control means includes an electronic timing device.

66. The device defined in claim 59 wherein said inflation control means includes a mechanical timing device.

67. The device defined in claim 59 wherein:
said inflation control means includes first and second control valves each having a bleeder valve feature, said bleeder valve providing said release means; and
said first control valve controls the inflation of said inflatable right and left seat compartments and said second control valve controls the inflation of said inflatable right and left back compartments.

68. The device defined in claim 59 wherein the inflation of first one of said inflatable right and left seat compartments and then the other, comprises one cycle, and said inflation control means is capable of controlling said inflation means to generate from about 1 to about 12 cycles per minute.

69. The device defined in claim 59 wherein said inflation control means is capable of inflating said inflatable left seat compartment at about the same time as said inflatable left back compartment and inflating said inflatable right seat compartment at about the same time as said inflatable right back compartment.

70. The device defined in claim 59 wherein said inflation control means is capable of inflating said inflatable left seat compartment at about the same time as said inflatable right back compartment and inflating said inflatable right seat compartment at about the same time as said inflatable left back compartment.

71. An ergonomic anti-fatigue device for moving the hips and lower midsection of a person seated in a seating apparatus having a seat section and a back section, the device comprising:
moveable compartment means comprising moveable right and left seat compartments located on the seat section of the seating apparatus and moveable right and left back compartments located on the back section of the seating apparatus, each of said moveable right and left seat compartments and right and left back compartments having a rest position, whereby when the person is seated on the seat section said moveable right seat compartment is located directly under the right hip of the person and said moveable left seat compartment is located directly under the left hip of the person, and said moveable right back compartment is located behind the right hip of the person and said moveable left back compartment is located behind the left hip of the person; and
movement and control means connected to each of said moveable right and left seat compartments and right and left back compartments for moving first one of said moveable right and left seat compartments upward against the person and back to said rest position, then moving the other of said moveable right and left seat compartments upward against the person and back to said rest position, thereby alternately lifting first one hip of the person and then the other hip, and said movement and control means also moving first one of said moveable right and left back compartments forward against the person and back to said rest position, then moving the other of said moveable right and left back compartments forward against the person and back to said rest position, thereby alternately pushing forward first one hip of the person and then the other hip, each of said moveable right and left back compartments being capable of alternately moving each hip of the person a forward distance of from about 5 millimeters to about 3 centimeters, whereby motion and stimulation are translated to the person in a similar fashion to the motion and stimulation imparted to the person through walking.

72. The device defined in claim 71 wherein said moveable right and left seat compartments are located inside the seat section of the seating apparatus, and said moveable right and left back compartments are located inside the back section of the seating apparatus.

73. The device defined in claim 71 wherein said movement and control means includes an electronic timing device.

74. The device defined in claim 71 wherein said movement and control means includes a mechanical timing device.

75. The device defined in claim 71 wherein the movement of first one of said moveable right and left seat compartments and then the other, comprises one cycle and said movement and control means is capable of controlling said movable right and left seat compartments to generate from about 1 to about 12 cycles per minute.

76. The device defined in claim 71 wherein said movement and control means is capable of moving said moveable left seat compartment at about the same time as said movable left back compartment and moving said moveable right seat compartment at about the same time as said movable right back compartment.

77. The device defined in claim 71 wherein said movement and control means is capable of moving said moveable left seat compartment at about the same time as said movable right back compartment and moving said moveable right seat compartment at about the same time as said movable left back compartment.

78. A method for moving the hips and lower midsection of a person seated in a seating apparatus having a seat section and a back section, the steps comprising:
providing inflatable right and left seat compartments located on the seat section of the seating apparatus such that when the person is seated on the seat section said inflatable right seat compartment is located directly under the right hip of the person, and said inflatable left seat compartment is located directly under the left hip of the person, each of said inflatable right and left seat compartments having an interior;

providing inflatable right and left back compartments located on the back section of the seating apparatus such that when the person is seated on the seat section said inflatable right back compartment is located behind the right hip of the person and said inflatable left back compartment is located behind the left hip of the person, each of said inflatable right and left back compartments having an interior;

providing inflation means connected to each of said inflatable right and left seat compartments and right and left back compartments for inflating said inflatable right and left seat compartments and right and left back compartments; and inflating first one of said inflatable right and left seat compartments and then the other, thereby alternately lifting first one hip of the person and then the other hip, and inflating first one of said inflatable right and left back compartments and then the other, thereby alternately pushing forward first one hip of the person and then the other hip, each of said inflatable right and left back compartments being capable of alternately moving each hip of the person a forward distance of from about 5 millimeters to about 3 centimeters, whereby motion and stimulation are translated to the person in a similar fashion to the motion and stimulation imparted to the person through walking.

79. The method described in claim 78 including the steps of locating said inflatable right and left seat compartments inside the seat section of the seating apparatus; and locating said inflatable right and left back compartments inside the back section of the seating apparatus.

80. The method described in claim 78 wherein the inflation of first one of said inflatable right and left seat compartments and then the other comprises one cycle and said cycle is repeated from about 1 to about 12 times per minute.

81. A method for moving the hips and lower midsection of a person seated in a seating apparatus having a seat section and a back section, the steps comprising:

providing moveable right and left seat compartments located on the seat section of the seating apparatus such that when the person is seated on the seat section said moveable right seat compartment is located directly under the right hip of the person, and said moveable left compartment is located directly under the left hip of the person, each of said moveable right and left seat compartments having a rest position;

providing moveable right and left back compartments located on the back section of the seating apparatus such that when the person is seated on the seat section said moveable right back compartment is located behind the right hip of the person and said moveable left back compartment is located behind the left hip of the person, each of said moveable right and left back compartments having a rest position;

providing movement means connected to each of said moveable right and left seat compartments and right and left back compartments for moving said moveable right and left seat compartments and right and left back compartments;

moving first one of said moveable right and left seat compartments upward against the person and back to said rest position, then moving the other of said moveable right and left seat compartments upward against the person and back to said rest position, thereby alternately lifting first one hip of the person and then the other hip, and moving first one of said moveable right and left back compartments forward against the person and back to said rest position, then moving the other of said moveable right and left back compartments forward against the person and back to said rest position, thereby alternately pushing forward first one hip of the person and then the other hip, each of said moveable right and left back compartments being capable of alternately moving each hip of the person a forward distance of from about 5 millimeters to about 3 centimeters, whereby motion and stimulation are translated to the person in a similar fashion to the motion and stimulation imparted to the person through walking.

82. The method described in claim 81 wherein said moveable right and left seat compartments located inside the seat section of the seating apparatus, and said moveable right and left back compartments located inside the back section of the seating apparatus.

83. The method described in claim 81 wherein the upward movement of first one moveable right and left seat compartment and then the other moveable right and left seat compartment comprises one cycle and said cycle is repeated from about 1 to about 12 times per minute.

84. An ergonomic anti-fatigue device for moving the hips and lower midsection of a person seated in a seating apparatus having a seat section, the device comprising:

inflatable compartment means comprising inflatable right and left compartments located on the seat section of the seating apparatus such that when the person is seated on the seat section said inflatable right compartment is located directly under the right hip of the person and said inflatable left compartment is located directly under the left hip of the person; and inflation and control means for inflating only a first one of said inflatable left and right compartments and then the other directly thereafter, thereby alternately lifting first one hip of the person and then the other hip directly thereafter, whereby motion and stimulation are translated to the person in a similar fashion to the motion and stimulation imparted to the person through walking.

85. The device defined in claim 84 wherein said inflatable right compartment is position under the right ischium bone of the person and said inflatable left compartment is positioned under the left ischium bone of the person.

86. An ergonomic anti-fatigue device for moving the hips and lower midsection of a person seated in a seating apparatus having a seat section, the device comprising:

inflatable compartment means comprising inflatable right and left compartments, wherein said inflatable right and left compartments are located on the seat section of the seating apparatus such that when the person is seated on the seat section said inflatable right compartment is located directly under the right hip of the person and said inflatable left compartment is located directly under the left hip of the person, said inflatable right and left compartments each having an interior;

inflation means connected to each of said inflatable right and left compartments for inflating said inflatable right and left compartments;

release means connected to each of said inflatable right and left compartments and providing a path for airflow from said interior of said inflatable right and left compartments to the atmosphere when each of said inflatable right and left compartments is not being inflated; and inflation control means connected to said inflation means for controlling the inflation means to inflate only a first one of said inflatable right and left compartments and then the other directly thereafter, thereby alternately lifting first one of hip of the person and then the other hip directly thereafter, whereby motion and stimulation are translated to the person in a similar fashion to the motion and stimulation imparted to the person through walking.

87. The device defined in claim 86 further having housing means for housing said inflatable compartment means, said housing means being capable of placement on the seat section of the seating apparatus.

88. The device defined in claim 87 wherein said housing means includes attachment means for attachment of said housing means to the seating apparatus.

89. The device defined in claim 87 wherein said housing means includes a flexible pad.

90. The device defined in claim 86 wherein said inflatable compartment means is located inside the seat section of the seating apparatus.

91. The device defined in claim 86 wherein said inflatable compartment means is of a single inflatable compartment having a wall in the interior of said single inflatable compartment, separating said single inflatable compartment into two inflatable compartments, thereby forming said inflatable right and left compartments.

92. The device defined in claim 86 wherein said inflation means includes an air pump having hose means for transporting air to each of said inflatable right and left compartments.

93. The device defined in claim 86 wherein said release means includes a bleeder valve.

94. The device defined in claim 86 wherein said inflation control means includes a control valve having a bleeder valve feature, said bleeder valve providing said release means.

95. The device defined in claim 86 wherein said inflation control means includes an electronic timing device.

96. The device defined in claim 86 wherein said inflation control means includes a mechanical timing device.

97. The device defined in claim 86 wherein each of said inflatable right and left compartments is capable of alternately lifting each hip of the person a vertical distance of from about 5 millimeters to about 3 centimeters.

98. The device defined in claim 90 wherein the inflation of first one of said inflatable right and left compartments and then the other of said inflatable compartments comprises one cycle and said right and left inflation control means is capable of controlling said inflation means to generate from about 1 to about 12 cycles per minute.

99. An ergonomic anti-fatigue device for moving the hips and lower midsection of a person seated in a seating apparatus having a seat section and a back section, the device comprising:
   inflatable compartment means comprising inflatable right and left seat compartments located on the seat section of the seating apparatus and inflatable right and left back compartments located on the back section of the seating apparatus, each of said inflatable right and left seat compartments and right and left back compartments having an interior, whereby when the person is seated on the seat section said inflatable right seat compartment is located directly under the right hip of the person and said inflatable left seat compartment is located directly under the left hip of the person, and said inflatable right back compartment is located behind the right hip of the person and said inflatable left back compartment is located behind the left hip of the person;
   inflation means connected to each of said inflatable right and left seat compartments and right and left back compartments for inflating said inflatable right and left seat compartments and right and left back compartments;
   release means connected to each of said inflatable right and left seat compartments and right and left back compartments and providing a path for airflow from said interior of said inflatable right and left seat compartments and right and left back compartments to the atmosphere when each of said inflatable right and left seat compartments and right and left back compartments is not being inflated; and
   inflation control means connected to said inflation means for controlling said inflation means, for inflating first one of said inflatable right and left seat compartments and then the other, thereby alternately lifting first one hip of the person and then the other hip, and said inflation control means also controlling said inflation means for inflating first one of said inflatable right and left back compartments and then the other, thereby alternately pushing forward first one hip of the person and then the other hip, whereby motion and stimulation are translated to the person in a similar fashion to the motion and stimulation imparted to the person through walking;
   wherein said inflation control means is capable of inflating said inflatable left seat compartment at about the same time as said inflatable left back compartment and inflating said inflatable right seat compartment at about the same time as said inflatable right back compartment.

100. The device defined in claim 99 including housing means for housing said inflatable compartment means, said housing means being capable of placement on the seat section of the seating apparatus and against the back section, said housing means also having attachment means for attachment of said housing means to the seating apparatus.

101. The device defined in claim 100 wherein said housing means includes a flexible pad.

102. The device defined in claim 99 wherein said inflatable right and left seat compartments are located inside the seat section of the seating apparatus, and said inflatable right and left back compartments are located inside the back section of said seating apparatus.

103. The device defined in claim 99 wherein said inflatable compartment means is comprised of two single inflatable compartments, each of said single inflatable compartments having a wall in the interior of said single inflatable compartment to separate said single inflatable compartment into two inflatable compartments, thereby forming said inflatable right and left seat compartments and said inflatable right and left back compartments.

104. The device defined in claim 99 wherein said inflation means includes an air pump having hose means for transporting air to each of said inflatable right and left seat compartments and right and left back compartments.

105. The device defined in claim 99 wherein said inflation control means includes an electronic timing device.

106. The device defined in claim 99 wherein said inflation control means includes a mechanical timing device.

107. The device defined in claim 99 wherein:
   said inflation control means includes first and second control valves each having a bleeder valve feature, said bleeder valve providing said release means; and said first control valve controls the inflation of said inflatable right and left seat compartments and said second control valve controls the inflation of said inflatable right and left back compartments.

108. The device defined in claim 99 wherein the inflation of first one of said inflatable right and left seat compartments and then the other, comprises one cycle, and said inflation control means is capable of controlling said inflation means to generate from about 1 to about 12 cycles per minute.

109. An ergonomic anti-fatigue device for moving the hips and lower midsection of a person seated in a seating apparatus having a seat section, the device comprising:

moveable compartment means comprising moveable left and right compartments located on the seat section of the seating apparatus such that when the person is seated on the seat section said moveable right compartment is located directly under the right hip of the person and said moveable left compartment is located directly under the left hip of the person, each of said moveable left and right compartments having a rest position; and movement and control means connected to each of said moveable left and right compartments for moving only a first one of said moveable left and right compartments upward against the person and back to said rest position, then moving the other of said moveable left and right compartments directly thereafter upward against the person and back to said rest position, thereby alternately lifting first one hip of the person and then the other hip directly thereafter, whereby motion and stimulation are translated to the person in a similar fashion to the motion and stimulation imparted to the person through walking.

110. The device defined in claim 109 wherein said moveable compartment means is located inside the seat section of the seating apparatus.

111. The device defined in claim 109 wherein said movement and control means includes an electronic timing device.

112. The device defined in claim 109 wherein said movement and control means includes a mechanical timing device.

113. The device defined in claim 109 wherein each of said moveable left and right compartments is capable of lifting each hip of the person an upward distance of from about 5 millimeters to about 3 centimeters.

114. The device defined in claim 109 wherein the movement of first one of said moveable left and right compartments and then the other comprises one cycle, and said movement and control means is capable of controlling said moveable compartments to generate from about 1 to about 12 cycles per minute.

115. An ergonomic anti-fatigue device for moving the hips and lower midsection of a person seated in a seating apparatus having a seat section and a back section, the device comprising:

moveable compartment means comprising moveable right and left seat compartments located on the seat section of the seating apparatus and moveable right and left back compartments located on the back section of the seating apparatus, each of said moveable right and left seat compartments and right and left back compartments having a rest position, whereby when the person is seated on the seat section said moveable right seat compartment is located directly under the right hip of the person and said moveable left seat compartment is located directly under the left hip of the person, and said moveable right back compartment is located behind the right hip of the person and said moveable left back compartment is located behind the left hip of the person; and movement and control means connected to each of said moveable right and left seat compartments and right and left back compartments for moving first one of said moveable right and left seat compartments upward against the person and back to said rest position, then moving the other of said moveable right and left seat compartments upward against the person and back to said rest position, thereby alternately lifting first one hip of the person and then the other hip, and said movement and control means also moving first one of said moveable right and left back compartments forward against the person and back to said rest position, then moving the other of said moveable right and left back compartments forward against the person and back to said rest position, thereby alternately pushing forward first one hip of the person and then the other hip, whereby motion and stimulation are translated to the person in a similar fashion to the motion and stimulation imparted to the person through walking;

wherein said movement and control means is capable of moving said moveable left seat compartment at about the same time as said movable left back compartment and moving said moveable right seat compartment at about the same time as said movable right back compartment.

116. The device defined in claim 115 wherein said moveable right and left seat compartments are located inside the seat section of the seating apparatus, and said moveable right and left back compartments are located inside the back section of the seating apparatus.

117. The device defined in claim 115 wherein said movement and control means includes an electronic timing device.

118. The device defined in claim 115 wherein said movement and control means includes a mechanical timing device.

119. The device defined in claim 115 wherein the movement of first one of said moveable right and left seat compartments and then the other, comprises one cycle and said movement and control means is capable of controlling said movable right and left seat compartments to generate from about 1 to about 12 cycles per minute.

120. A method for moving the hips and lower midsection of a person seated in a seating apparatus, comprising the steps of:

providing inflatable right and left compartments such that when the person is seated on the seating apparatus said inflatable right compartment is located directly under the right hip of the person, and said inflatable left compartment is located directly under the left hip of the person, each of said inflatable right and left compartments having an interior;

providing inflation means for inflating said inflatable right and left compartments;

providing release means connected to each of said inflatable right and left compartments for providing a path for air flow from said interior of said inflatable right and left compartments to the atmosphere when each of said inflatable right and left compartments is not being inflated; and activating said inflation means in order to inflate only a first one of said inflatable right and left compartments and then the other of said inflatable right and left compartments directly thereafter, thereby alternately lifting first one hip of the person and then the other hip of the person directly thereafter, whereby motion and stimulation are translated to the person in a similar fashion to the motion and stimulation imparted to the person through walking.

121. The method defined in claim 120 wherein each of said inflatable right and left compartments is capable of alternately lifting each hip of the person an upward distance of from about 5 millimeters to about 3 centimeters.

122. The method defined in claim 120 wherein the inflation of first one of said inflatable right and left compartments and then the other comprises one cycle, and said cycle is repeated from about 1 to about 12 times per minute.

123. A method for moving the hips and lower midsection of a person seated in a seating apparatus having a seat section and a back section, the steps comprising:

providing inflatable right and left seat compartments located on the seat section of the seating apparatus such that when the person is seated on the seat section said inflatable right seat compartment is located directly under the right hip of the person, and said inflatable left seat compartment is located directly under the left hip of the person, each of said inflatable right and left seat compartments having an interior;

providing inflatable right and left back compartments located on the back section of the seating apparatus such that when the person is seated on the seat section said inflatable right back compartment is located behind the right hip of the person and said inflatable left back compartment is located behind the left hip of the person, each of said inflatable right and left back compartments having an interior;

providing inflation means connected to each of said inflatable right and left seat compartments and right and left back compartments for inflating said inflatable right and left seat compartments and right and left back compartments; and inflating first one of said inflatable right and left seat compartments and then the other, thereby alternately lifting first one hip of the person and then the other hip, and inflating first one of said inflatable right and left back compartments and then the other, thereby alternately pushing forward first one hip of the person and then the other hip, whereby motion and stimulation are translated to the person in a similar fashion to the motion and stimulation imparted to the person through walking;

wherein said inflation means is capable of inflating said inflatable left seat compartment at about the same time as said inflatable left back compartment and inflating said inflatable right seat compartment at about the same time as said inflatable right back compartment.

124. The method described in claim 123 including the steps of locating said inflatable right and left seat compartments inside the seat section of the seating apparatus, and locating said inflatable right and left back compartments inside the back section of the seating apparatus.

125. The method described in claim 123 wherein each of said inflatable right and left seat compartments is capable of lifting each hip of the person an upward distance of from about 5 millimeters to about 3 centimeters, and each of said right and left back compartments is capable of moving each hip of the person a forward distance of from about 5 millimeters to about 3 centimeters.

126. The method described in claim 123 wherein the inflation of first one of said inflatable right and left seat compartments and then the other comprises one cycle and said cycle is repeated from about 1 to about 12 times per minute.

127. A method for moving the hips and lower midsection of a person seated in a seating apparatus, comprising the steps of:

providing right and left movable compartment such that when the person is seated on the seating apparatus said movable right compartment is located directly under the right hip of the person, and said movable left compartment is located directly under the left hip of the person, each of said movable right and left compartments having a rest position;

providing movement means connected to each of said movable right and left compartments for moving said movable right and left compartments; and moving only a first one of said movable right and left compartments upward against the person and then back to said rest position, then moving the other of said movable right and left compartments directly thereafter upward against the person and then back to said rest position, thereby alternately lifting first one hip of the person and then the other hip of the person directly thereafter, whereby motion and stimulation are translated to the person in a similar fashion to the motion and stimulation imparted to the person through walking.

128. The method defined in claim 127 wherein each of said moveable right and left compartments is capable of alternately lifting each hip of the person an upward distance of from about 5 millimeters to about 3 centimeters.

129. The method defined in claim 127 wherein the movement of first one of said moveable right and left compartments and then the other comprises one cycle, and said cycle is repeated from about 1 to about 12 times per minute.

130. A method for moving the hips and lower midsection of a person seated in a seating apparatus having a seat section and a back section, the steps comprising:

providing moveable right and left seat compartments located on the seat section of the seating apparatus such that when the person is seated on the seat section said moveable right seat compartment is located directly under the right hip of the person, and said moveable left compartment is located directly under the left hip of the person, each of said moveable right and left seat compartments having a rest position;

providing moveable right and left back compartments located on the back section of the seating apparatus such that when the person is seated on the seat section said moveable right back compartment is located behind the right hip of the person and said moveable left back compartment is located behind the left hip of the person, each of said moveable right and left back compartments having a rest position;

providing movement means connected to each of said moveable right and left seat compartments and right and left back compartments for moving said moveable right and left seat compartments and right and left back compartments;

moving first one of said moveable right and left seat compartments upward against the person and back to said rest position, then moving the other of said moveable right and left seat compartments upward against the person and back to said rest position, thereby alternately lifting first one hip of the person and then the other hip, and moving first one of said moveable right and left back compartments forward against the person and back to said rest position, then moving the other of said moveable right and left back compartments forward against the person and back to said rest position, thereby alternately pushing forward first one hip of the person and then the other hip, whereby motion and stimulation are translated to the person in a similar fashion to the motion and stimulation imparted to the person through walking;

wherein said movement means is capable of moving said moveable left seat compartment at about the same time as said movable left back compartment and moving said moveable right seat compartment at about the same time as said movable right back compartment.

131. The method described in claim 130 wherein said moveable right and left seat compartments located inside the seat section of the seating apparatus, and said moveable right and left back compartments located inside the back section of the seating apparatus.

132. The method described in claim 130 wherein each of said moveable right and left seat compartments is capable of alternately lifting each hip of the person an upward distance of from about 5 millimeters to about 3 centimeters, and each of said moveable right and left back compartments is capable of alternately moving each hip of the person a forward distance of from about 5 millimeters to about 3 centimeters.

133. The method described in claim 130 wherein the upward movement of first one moveable right and left seat compartment and then the other moveable right and left seat compartment comprises one cycle and said cycle is repeated from about 1 to about 12 times per minute.

134. An ergonomic anti-fatigue device for moving the hips and lower midsection of a person seated in a seating apparatus having a seat section and a back section, the device comprising:

inflatable compartment means comprising inflatable right and left seat compartments located on the seat section of the seating apparatus and inflatable right and left back compartments located on the back section of the seating apparatus, each of said inflatable right and left seat compartments and right and left back compartments having an interior, whereby when the person is seated on the seat section said inflatable right seat compartment is located directly under the right hip of the person and said inflatable left seat compartment is located directly under the left hip of the person, and said inflatable right back compartment is located behind the right hip of the person and said inflatable left back compartment is located behind the left hip of the person;

inflation means connected to each of said inflatable right and left seat compartments and right and left back compartments for inflating said inflatable right and left seat compartments and right and left back compartments;

release means connected to each of said inflatable right and left seat compartments and right and left back compartments and providing a path for airflow from said interior of said inflatable right and left seat compartments and right and left back compartments to the atmosphere when each of said inflatable right and left seat compartments and right and left back compartments is not being inflated; and inflation control means connected to said inflation means, said inflation control means including first and second control valves each having a bleeder valve feature, said bleeder valve providing said release means, said first control valve controlling said inflation means for inflating first one of said inflatable right and left seat compartments and then the other, thereby alternately lifting first one hip of the person and then the other hip, and said second control valve controlling said inflation means for inflating first one of said inflatable right and left back compartments and then the other, thereby alternately pushing forward first one hip of the person and then the other hip, whereby motion and stimulation are translated to the person in a similar fashion to the motion and stimulation imparted to the person through walking.

135. The device defined in claim 134 including housing means for housing said inflatable compartment means, said housing means being capable of placement on the seat section of the seating apparatus and against the back section, said housing means also having attachment means for attachment of said housing means to the seating apparatus.

136. The device defined in claim 135 wherein said housing means includes a flexible pad.

137. The device defined in claim 134 wherein said inflatable right and left seat compartments are located inside the seat section of the seating apparatus, and said inflatable right and left back compartments are located inside the back section of said seating apparatus.

138. The device defined in claim 134 wherein said inflatable compartment means is comprised of two single inflatable compartments, each of said single inflatable compartments having a wall in the interior of said single inflatable compartment to separate said single inflatable compartment into two inflatable compartments, thereby forming said inflatable right and left seat compartments and said inflatable right and left back compartments.

139. The device defined in claim 134 wherein said inflation means includes an air pump having hose means for transporting air to each of said inflatable right and left seat compartments and right and left back compartments.

140. The device defined in claim 134 wherein said inflation control means includes an electronic timing device.

141. The device defined in claim 134 wherein said inflation control means includes a mechanical timing device.

142. The device defined in claim 134 wherein the inflation of first one of said inflatable right and left seat compartments and then the other, comprises one cycle, and said inflation control means is capable of controlling said inflation means to generate from about 1 to about 12 cycles per minute.

143. A method for moving the hips and lower midsection of a person seated in a seating apparatus having a seat section and a back section, the steps comprising:

providing inflatable right and left seat compartments located on the seat section of the seating apparatus such that when the person is seated on the seat section said inflatable right seat compartment is located directly under the right hip of the person, and said inflatable left seat compartment is located directly under the left hip of the person, each of said inflatable right and left seat compartments having an interior;

providing inflatable right and left back compartments located on the back section of the seating apparatus such that when the person is seated on the seat section said inflatable right back compartment is located behind the right hip of the person, and said inflatable left back compartment is located behind the left hip of the person, each of said inflatable right and left back compartments having an interior;

providing inflation means connected to each of said inflatable right and left seat compartments and right and left back compartments for inflating said inflatable right and left seat compartments and right and left back compartments;

providing inflation control means connected to said inflation means, said inflation control means including first and second control valves each having a bleeder valve feature, said first control valve controlling said inflation means for inflating said inflatable right and left seat compartments, said second control valve controlling said inflation means for inflating said inflatable right and left back compartments; and inflating first one of said inflatable right and left seat compartments and then the other, thereby alternately lifting first one hip of the person and then the other hip, and inflating first one of said inflatable right and left back compartments and then the other, thereby alternately pushing forward first one hip of the person and then the other hip, whereby motion and stimulation are translated to the person in a similar fashion to the motion and stimulation imparted to the person through walking.

144. The method described in claim 143 including the steps of locating said inflatable right and left seat compartments inside the seat section of the seating apparatus, and locating said inflatable right and left back compartments inside the back section of the seating apparatus.

145. The method described in claim 143 wherein each of said inflatable right and left seat compartments is capable of lifting each hip of the person an upward distance of from about 5 millimeters to about 3 centimeters.

146. The method described in claim 143 wherein each of said right and left back compartments is capable of moving each hip of the person a forward distance of from about 5 millimeters to about 3 centimeters.

147. The method described in claim 143 wherein each of said inflatable right and left seat compartments is capable of lifting each hip of the person an upward distance of from about 5 millimeters to about 3 centimeters, and each of said right and left back compartments is capable of moving each hip of the person a forward distance of from about 5 millimeters to about 3 centimeters.

148. The method described in claim 143 wherein the inflation of first one of said inflatable right and left seat compartments and then the other comprises one cycle and said cycle is repeated from about 1 to about 12 times per minute.

149. The method described in claim 143 wherein said inflation control means is capable of inflating said inflatable left seat compartment at about the same time as said inflatable left back compartment and inflating said inflatable right seat compartment at about the same time as said inflatable right back compartment.

150. The method described in claim 143 wherein said inflation control means is capable of inflating said inflatable left seat compartment at about the same time as said inflatable right back compartment and inflating said inflatable right seat compartment at about the same time as said inflatable left back compartment.

* * * * *